United States Patent [19]

Erazo et al.

[11] Patent Number: 4,779,776
[45] Date of Patent: Oct. 25, 1988

[54] SEEDING DEVICE

[75] Inventors: Fernando Erazo, Closter, N.J.; Richard W. Conant, West Southport, Me.

[73] Assignee: Aglukon Spezialduenger GmbH, Duesseldorf, Fed. Rep. of Germany

[21] Appl. No.: 914,811

[22] Filed: Oct. 3, 1986

Related U.S. Application Data

[62] Division of Ser. No. 603,144, Apr. 23, 1984, Pat. No. 4,632,244.

[51] Int. Cl.⁴ ............................................. A01C 7/18
[52] U.S. Cl. ................................. 222/615; 222/618; 222/621; 222/623; 222/214; 111/7
[58] Field of Search ............... 222/613, 615, 618, 620, 222/621, 623, 214; 111/1, 6, 7, 3; 47/9; 239/157

[56] References Cited

U.S. PATENT DOCUMENTS

| | | | |
|---|---|---|---|
| 612,751 | 10/1898 | McCarty | 222/615 |
| 920,250 | 5/1909 | Blakeslee | 222/214 X |
| 1,792,577 | 2/1931 | Eastman | 222/615 X |
| 3,172,574 | 3/1965 | Hiler et al. | 222/615 |
| 3,648,631 | 3/1972 | Fiedler et al. | 111/6 |
| 4,265,185 | 5/1981 | Skipper | 222/370 X |
| 4,529,106 | 7/1985 | Broadfoot et al. | 222/214 X |

Primary Examiner—Joseph J. Rolla
Assistant Examiner—Frederick R. Handren
Attorney, Agent, or Firm—Curtis, Morris & Safford

[57] ABSTRACT

A seeding device to dispense seed suspended in a gel or other carrier medium in either a continuous stream or discrete pulses. A coulter opens a furrow of earth to the proper depth and seed carried in a gel or other suspension medium is delivered in a pulsed or continuous stream into the furrow which is then covered with earth by a trailing coverer. An auger delivers the seed in suspension and the speed of the auger is controlled to vary the volume of seed and gel or other suspension medium delivered. Circumferentially spaced cam lobes on a drive wheel control the frequency and therefore the row spacing of the seed suspension medium distributed in the pulse delivery mode.

9 Claims, 6 Drawing Sheets

SEEDING DEVICE

This application is a division of application Ser. No. 603,144, filed Apr. 23, 1984, now U.S. Pat. No. 4,632,244.

FIELD OF THE INVENTION

The present invention relates to a seeding device and more particularly a seeding device which may be mounted behind a tractor to distribute and plant seed carried in a gel or other suspension medium.

BACKGROUND OF THE INVENTION

In many agricultural applications gel seeding is utilized. In gel seeding, seeds carried within a gel-like suspension are distributed for planting. Gel seeding results in certain benefits in that seeds may be pregerminated prior to planting. This provides certain benefits such as the ability to plant seeds earlier than normal, as the seeds are protected by the gel coating. Another benefit to gel seeding is that gel coated seeds may be planted later than normal with the resultant earlier harvest because of the pregermination and a further benefit of gel seeding is the elimination of the need to transplant seedlings grown in a hot house environment to the outdoors.

When gel coating of seeds is utilized particular problems of seeding result in that normal seeding techniques are often not suitable due to the necessity to preserve and protect budding plants and fragile seedlings.

SUMMARY OF THE INVENTION

In a preferred embodiment of the present invention an auger delivers seed carried in a suitable carrier or suspension medium to a delivery system. The speed of the auger, and hence the volume or quantity of seed in suspension delivered, is controlled by adjustment of the auger drive mechanism. In one mode of operation the seeds in suspension are delivered in a steady stream. In another mode of operation the delivery system delivers the seeds in suspension in timed pulsed batches, the frequency of which are controlled by positioning a pulsed delivery mechanism with respect to camming lobes on a drive wheel.

Accordingly, it is an object of the present invention to provide a gel seeding device which simply and economically provides an effective yet safe device to plant seeds suspended in a gel or other fluid suspension in the ground.

A further object of the present invention is to provide such a device having the ability to vary the frequency and volume of gel suspended seeds to accommodate various planting environments.

A still further object of the present invention is to provide a gel seeding device which may deliver either a continuous stream of seeds suspended in a gel or clumps of seed suspended in said gel at variable selected spacings.

BRIEF DESCRIPTION OF THE DRAWING

These and other objects and advantages of the present invention will become more readily apparent after consideration of the following specification in conjunction with the drawings, wherein.

DESCRIPTION OF THE PREFERRED EMBODIMENTS

Figure 1:
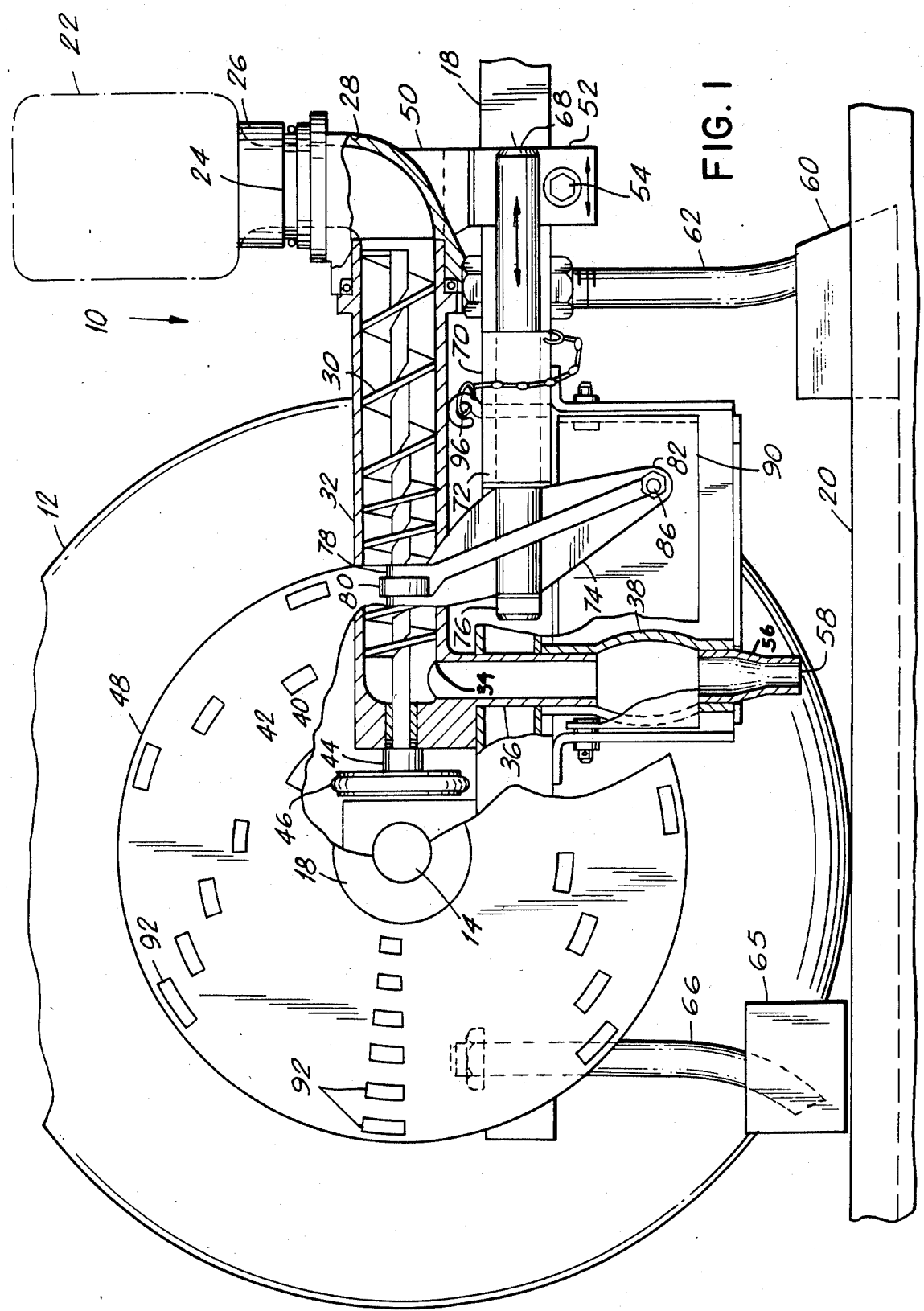
FIG. 1 is an elevational view, partly in section, showing the gel seeding device of the present invention.
Figure 2:
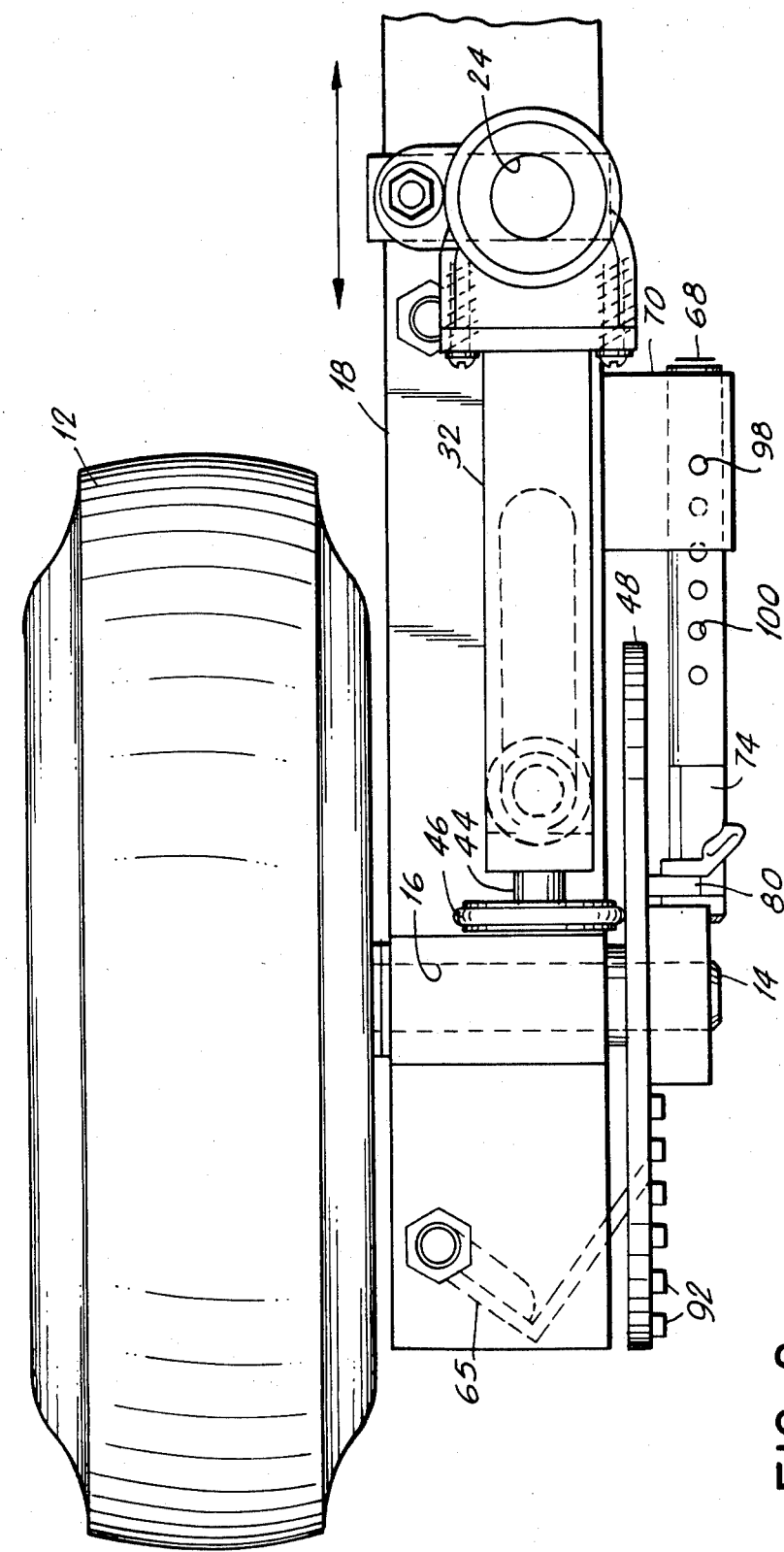
FIG. 2 is a top plan view of the device.
Figure 3:
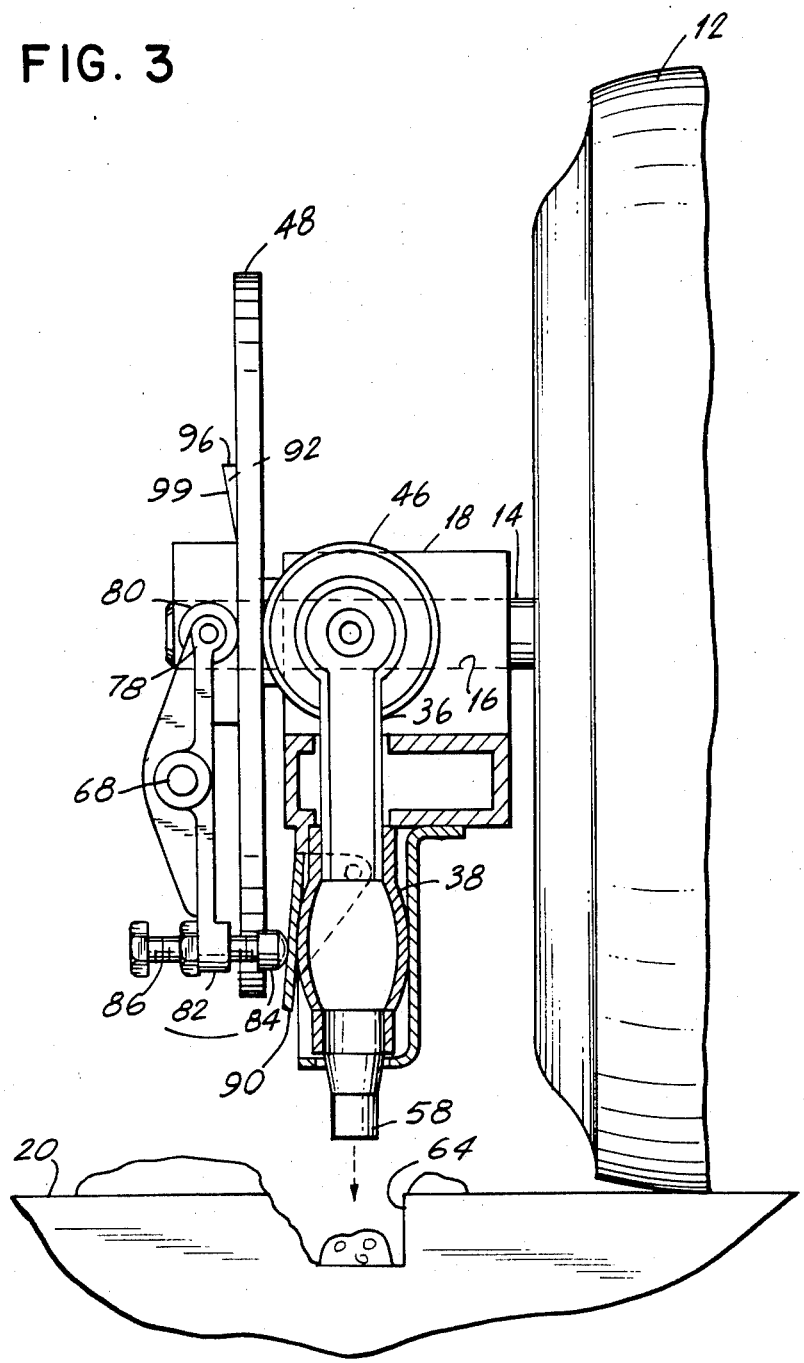
FIG. 3 is an elevational view, partly in section, showing the seed distribution mechanism of the present invention.

With reference to FIGS. 1 through 3 of the drawing it is seen that the seed feeding device 10 of the present invention includes a drive wheel 12 having an axle 14 journalled, as at 16, within a support frame 18. The forward end of frame 18 includes suitable provision (not shown) for attachment to a vehicle such as a tractor which rotates wheel 12, in contact with the ground 20 as the propelling vehicle moves in a forward direction.

Seed to be planted, which is suspended in a gel or fluid suspension, is supplied from a suitable reservoir tank 22 having an open end 24 secured within an inlet opening 26 of a distribution housing 28. The seed in the gel suspension is moved under the action of an auger 30 through auger housing 32 to an outlet opening 34 and feed line 36 into a pump bulb 38 fit over feed line 36 where it is temporarily retained prior to dispersion, as will be explained more fully hereinbelow.

The auger drive shaft 40 is journalled through the auger housing 32, as at 42, and includes an extending shaft portion 44 on which is mounted an auger drive wheel 46. A drive plate 48 is provided suitably keyed to axle 14 so that rotation of wheel 12 also rotates drive plate 48. Auger drive wheel 46 is maintained in friction contact with the inside facing surface, as viewed in FIG. 2, of drive plate 48 so that auger 30 is driven upon rotation of wheel 12.

The volume and, hence, the quantity of seed suspended in the gel-like carrier dispensed by the apparatus is controlled by the speed of rotation of auger 30. This most advantageously may be controlled by orientation of drive wheel 46 with respect to its area of contact on drive plate 48. The most radially inward point of contact provides the lowest rate of rotation of drive wheel 46 and auger 30, while the most radially outward point of contact provides the highest rotation rate for auger 30. Accordingly, provision is made to adjust the position of contact of drive wheel 46 against drive plate 48. This control of the auger speed provides a metering function for the auger.

To this end auger housing 32 is made slidably adjustable along frame 18 by securing auger housing 32 to frame 18 by a mounting subassembly 50 secured by a clamping member 52 to frame 18. A suitable clamping bolt 54 securely fixes clamp 52 to frame 18 to position the auger assembly for the desired rate of rotation. Loosening of bolt 54 permits lateral adjustment, as viewed in FIG. 1, of auger housing 32 with respect to frame 18 and drive plate 48 to orient drive wheel 46 in any position from its most radially inward position, illustrated in FIG. 1, to its most radially outward position adjacent the circumference of drive wheel 48. The apparatus is universally adjustable within this range to permit a wide selection of auger speeds to accommodate varying desired flow rates for the seed suspended in the gel carrier.

When a desired flow rate has been selected and the auger housing securely clamped on housing 18, the auger forces the gel carrier through the outlet opening down the feed line 36 where it accumulates in pump bulb 38. Pump bulb 38 is a bulbous reservoir formed of a resilient elastic material, such as rubber, neoprene, or the like and includes a discharge outlet 56 having a discharge opening 58 oriented slightly above the level of the ground 20. Feeding device 10 includes a coulter or plow-like device 60 secured by a mounting shaft 62 to the support frame 18. Coulter 60 is positioned in advance of the discharge opening 58 for the seed suspended in the gel carrier. As the device 10 is moved along a field, the coulter opens up a trough 64 (see FIG. 3) suitable to receive the gel carrier carrying the seed to be planted. The viscosity of the gel is such as to preclude free running of the carrier medium from the discharge opening 58 but the viscosity is such as to allow discharge at an even rate under action of the pressure supplied by the rotating auger 30. A plow-like coverer 65, also mounted to the auger housing backfills the dirt into the trough 64 to cover the newly dispersed seed. Coverer 65 is appropriately secured by a mounting shaft 66.

In another aspect of the invention the seed is delivered in pulsed clumps within the trough 64 under the action of a cam actuated clapper which periodically, at spaced time intervals, strikes the pump bulb to dislodge gel carrier in a sequence of pulsed clumps.

Accordingly, the device is provided with an extended jack shaft 68 secured to frame 18 by a shaft mount 70. Shaft mount 70 includes a through bore 72 within which jack shaft 68 is slidably disposed. A rocker arm assembly 74 is provided and one end 76 of jack shaft 68 is journalled within rocker arm 74 so that the rocker arm 74 may pivot about the axis of jack shaft 68. The upper end 78 of rocker arm 74 includes a cam follower 80 which rides along the exterior facing surface of drive wheel 48. The lower end 82 of rocker arm 74 carries a striker assembly 84 comprising a striking head 84 secured at the end of a threaded bolt 86 which is adjustably threaded within a threaded bore 88 in the lower end 82 of rocker arm 74.

A pivoted clapper paddle member 90 depends from housing 18 and rests against the exterior surface of pump bulb 38. The exterior facing surface of drive plate 48 includes a plurality of radially spaced cam surfaces 92 at discrete circumferentially displaced locations. Each cam surface 92 comprises an outwardly inclined surface 94 terminating in a sharp edge surface 96.

Upon rotation of drive plate 48 with rotation of wheel 12, the inclined surface 94 of a cam surface 92 when it moves into register with cam follower 80 pivots rocker arm 74 forcing striking head 86 against clapper paddle 90. This forces the clapper paddle 90 to pivot inwardly against the exterior surface of pump bulb 38, depressing the resilient bulb in a squeezing action, to eject a measured quantity of gel retained therein in a clump or spurt.

The spacing of the clumps is variable within a predetermined range by adjusting the location of cam follower 80 with respect to different sets of radially spaced cam surfaces 92. Thus the frequency of actuation of the clapper paddle 90 may be controlled by the circumferential spacing of cam surfaces 92 at the same radial location about drive plate 48. As seen in FIG. 1, the radial outermost sets of cam surfaces 92 are more numerous than other radially inward sets due to the greater circumferential extent. Thus, the outermost set of cam surfaces may be utilized for dispersal of seed in the gel carrier medium at the closest interval of spacing, for example 5½ inches between dispersal points. The sequentially inward sets may be utilized for larger intervals between dispersal points, for example, 6½, 8, 10, 13 and 19 inches, respectively.

Positioning of cam follower 80 to register with a selected set of cam surfaces 92 is accomplished by moving rocker arm and jack shaft assembly to the appropriate location in the shaft mount 70 and securing the assembly by a pin 96 passing through an access bore 98 in shaft mount 70 and through an access bore 100 in jack shaft 68.

When pulsed delivery of seed is desired, a determination is made as to the desired spacing between pulses and the device is set so that cam follower 80 registers with the proper set of cam surfaces 92 for the selected spacing. When continuous delivery is desired, the device is set so that cam follower 80 is beyond the outer limit of cam surfaces 92 so that there is no actuation of clapper paddle 90.

In both modes of operation further control of the quantity of seed delivered is controlled through the selection of the auger speed by proper positioning of the friction wheel 46 in contact with drive plate 48. In essence, auger 30 acts as a metering device to meter the selected quantity of gel carrying seed through the system.

Figure 4:
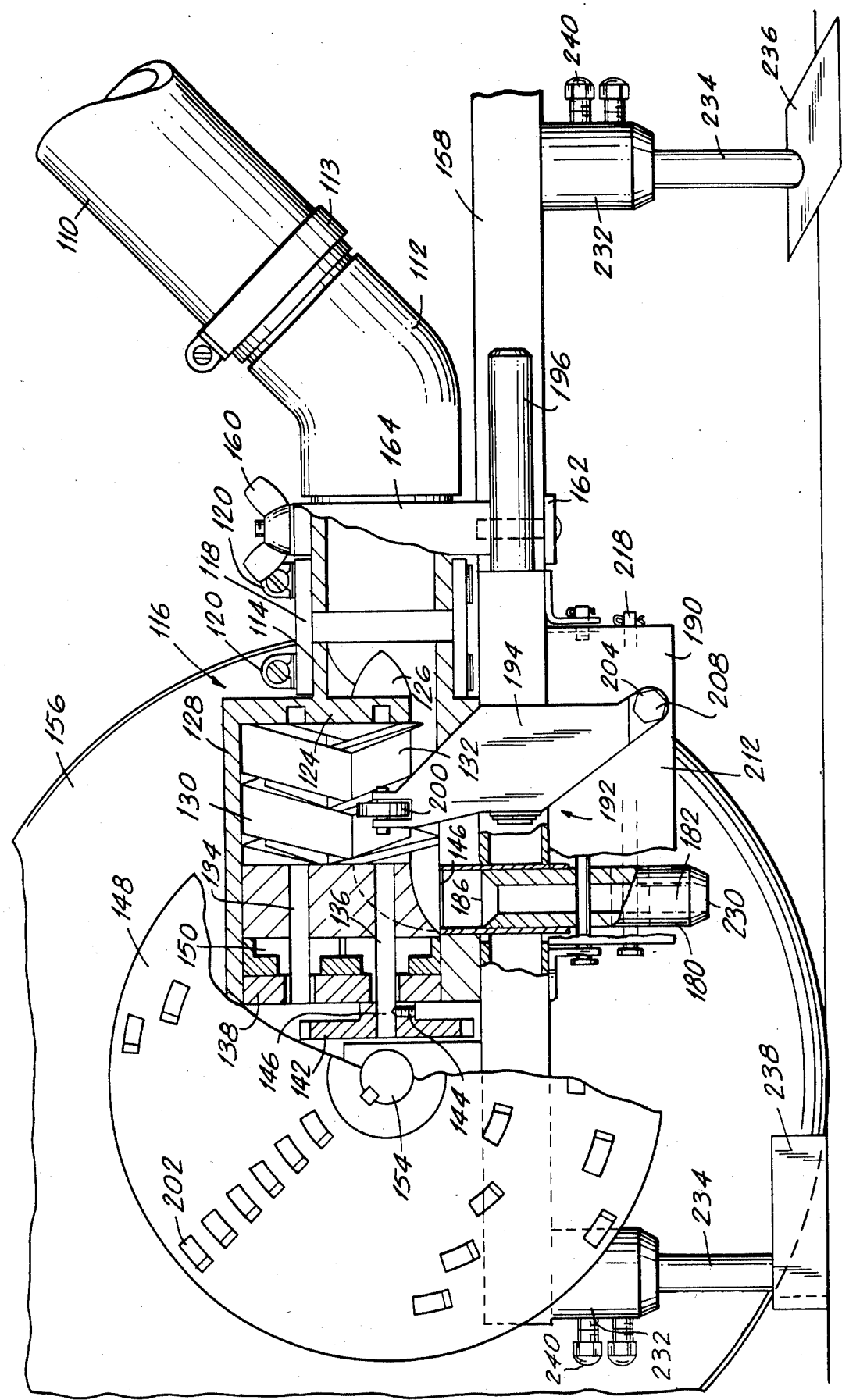
FIG. 4 is an elevational view, partly in section, showing an alternative embodiment of the present invention.
Figure 5:
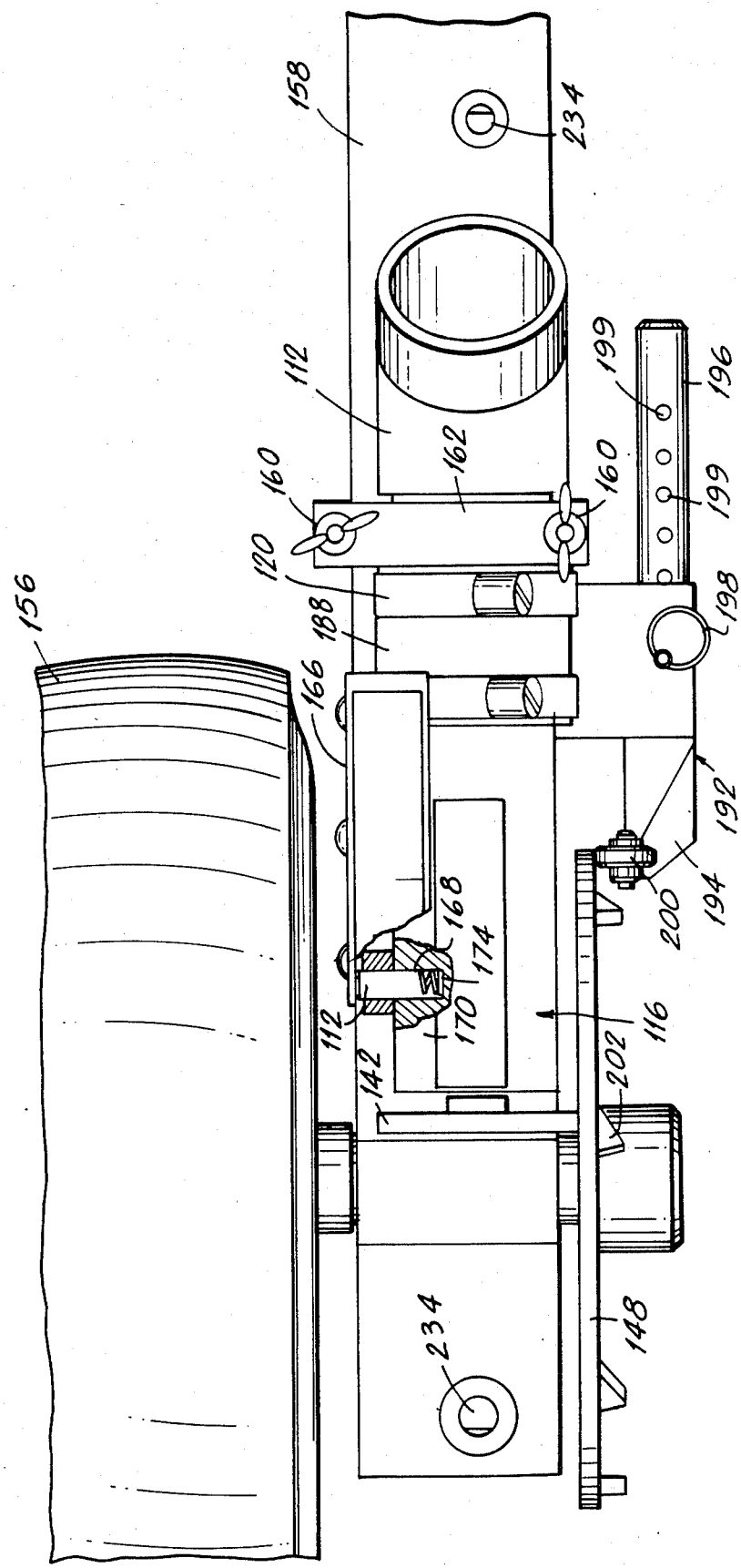
FIG. 5 is a top plan view of the embodiment shown in FIG. 4.
Figure 6:
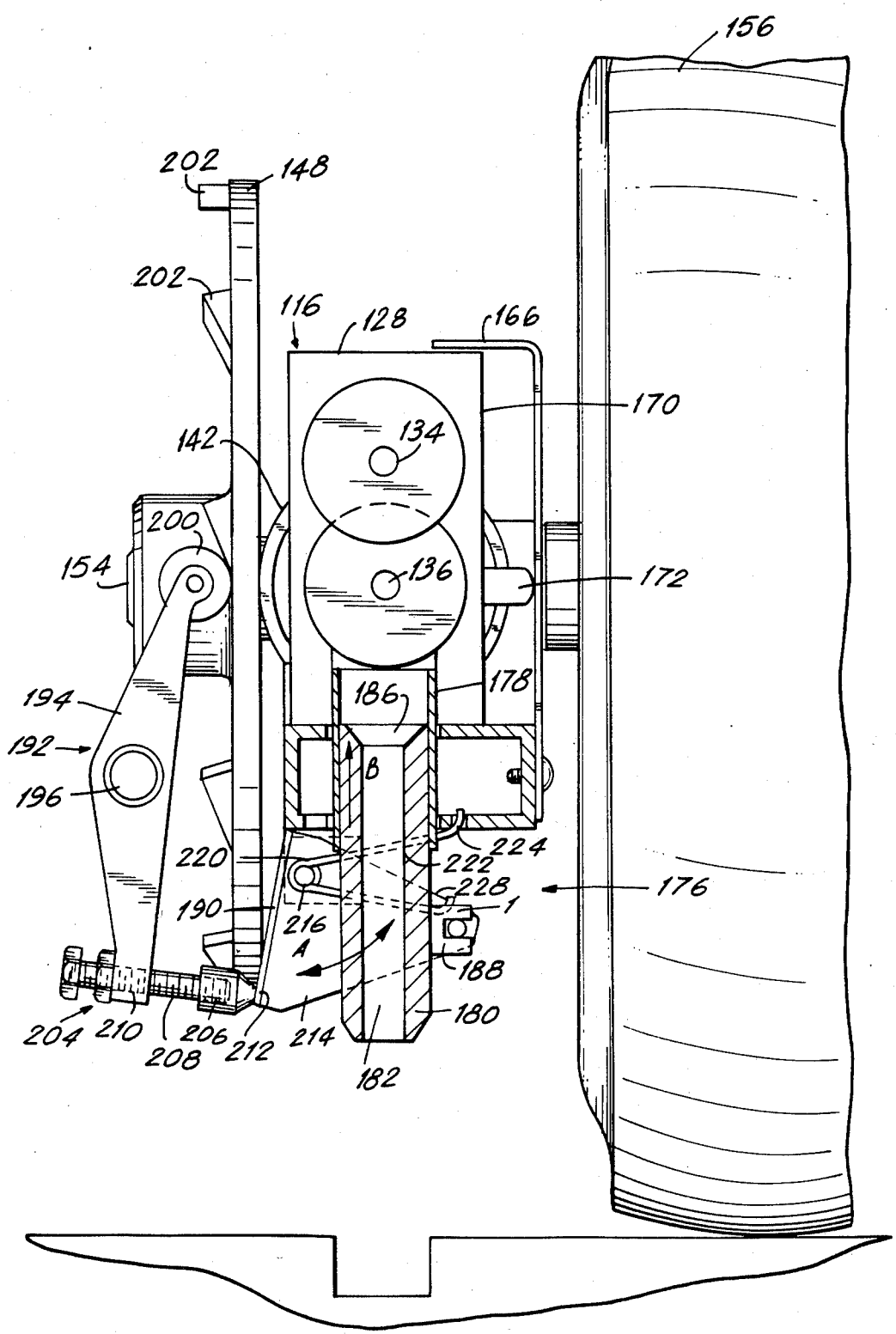
FIG. 6 is an elevational view, partly in section, showing the seed distribution mechanism of the embodiment of FIGS. 4 and 5.

An alternative embodiment of the present invention is illustrated in FIGS. 4 through 6 of the drawings. A feed conduit or flexible hose 110 is connected to the reservoir tank (such as 22 shown in FIG. 1) which contains the seed suspended in the gel-like carrier. The feed conduit 110 is secured to one end of a 45° elbow 112 by a clamp 113. The other end of the elbow 112 is connected to the intake barrel 114 of the auger assembly 116 by a sleeve 118 and clamps 120. The intake barrel 114 defines the inlet port 122 of the auger assembly into which flows the gel suspension carried in the reservoir. An internal end wall 124 of the intake barrel 114 includes a conically shaped nacelle 126 projecting into the inlet port 122 defined by the barrel. The nacelle 126 improves the flow of the gel suspension into the auger housing 128 of the assembly 116.

The particular embodiment illustrated in FIGS. 4 through 6 of the drawings includes not one auger as shown in the previous embodiment but rather two. A left-hand auger 130, preferably formed of Delrin a registered trademark of E. I. du Pont de Nemours & Co., Inc. or other synthetic material, and a right-hand auger 132, preferably made of aluminum, rotate with their shafts 134 and 136, respectively, within the auger housing 128. The shafts 134, 136 are journalled through the housing and supported near one end by a bushing plate 138 and at the other end by a wall of the auger housing which also defines the end wall 124 of the intake barrel. The shafts of the augers are parallel and positioned within the housing so that the blades of the augers overlap and intermesh in a cooperating fashion to help propel the gel suspension through the housing to an outlet opening 140.

The shaft 136 on which the right-hand auger 132 is mounted extends through the bushing plate 138. An auger drive wheel 142 is securely mounted by a set screw 144 onto the extended portion 146 and, like the previous embodiment, is positioned to contact the inside facing surface of the cam plate 148. A first gear 150 and a second gear 152 are respectively secured to the left-hand and right-hand auger shafts 134, 136 and situated on their shafts to intermesh with each other. This causes the left-hand auger 130 and right-hand auger 132 to rotate in unison. As with the previous embodiment, the cam plate 148 is keyed to the axle 154 on which the wheel 156 of the seeder is mounted so that rotation of the wheel 156 similarly rotates the cam plate 148. The auger drive wheel 142, which is in frictional contact with the cam plate 148, will also rotate with movement of the gel seeder. This causes the two augers which are gear-linked together to rotate in unison.

The use of double augers in this embodiment as opposed to the single auger of the embodiment illustrated in FIGS. 1 through 3 is advantageous in that the auger housing 128 may be made more compact with the two augers providing the required orce to propel the gel suspension through the housing. Also, the use of two closely fitted meshing augers provides a positive displacement action to more accurately meter the gel mixture.

As with the first embodiment described, the volume of gel suspension dispensed by the seeding apparatus shown in FIGS. 4 through 6 is controlled by the speed at which the augers 130, 132 rotate. This can be adjusted by repositioning the auger assembly 116 on the frame 158 of the seeding apparatus. By loosening the wing nuts 160 and clamp bar 162 and block 164 which secure the assembly 116 to the frame, the auger drive wheel 142 can be adjusted to contact the cam plate 148 at various distances from the axle 154 and thus rotate at different selectable rates.

An L-shaped pressure plate 166 is mounted on the frame 158 of the gel seeder. A bore 168 is formed in a side wall 170 of the auger housing 128 adjacent the pressure plate 166. The bore 168 receives a plunger 172 and a spring 174 which outwardly biases the plunger 172 against the pressure plate 166. The pressure of the plunger 172 against the pressure plate 166 forces the auger drive wheel 142 to remain in constant contact with the cam plate 148, thus insuring that the drive wheel 142 will always rotate with the rotation of the cam plate 148.

The gel suspension is forced by the augers through the auger housing 128 to the outlet opening 140 formed therein whereupon it enters the clump pump assembly 176 mounted to the frame below the auger assembly 116. The clump pump assembly 176 includes a pump tube 178 which closely receives the upper portion of a pump nozzle 180. The pump nozzle 180 has a cylindrical shape and includes a bore 182 formed axially through its entire length. The upper end surface 184 of the pump nozzle 180 is countersunk to form a widened inlet opening 186 which receives the flow of gel suspension from the auger assembly 116. The pump nozzle 180 is furnished with a U-shaped boss 188 which extends from a surface of the lower portion of the nozzle. As will become more apparent in the following description, the boss 188 functions to link the nozzle 180 with a pivoting lever plate 190 of the clump pump assembly so that the pivotal movement of the lever plate 190 is translated into a reciprocating motion of the nozzle 180 within the pump tube 178.

As with the embodiment illustrated in FIGS. 1 through 3, a rocker arm assembly 192 is included with this alternative embodiment. The assembly includes a rocker arm 194 which pivots about a jack shaft 196 mounted to the frame 158 of the gel seeder. The position of the rocker arm 194 on the jack shaft 196 can be adjusted by removing a ring pin 198 which holds the rocker arm in place on the shaft 196 and relocating the rocker arm 194 by inserting the ring pin 198 through one of several holes 199 formed diametrically through the shaft. The rocker arm 194 includes a cam follower 200 at its upper end which contacts the cam surfaces 202 protruding from the surface of the cam plate 148. Situated at the lower end of the rocker arm 194 is a striker assembly 204 which includes a striking head 206 secured to the end of a threaded bolt 208. The bolt 208 is received by a threaded bore 210 formed in the rocker arm 194.

As previously mentioned, the clump pump assembly 176 includes a lever plate 190. The lever plate 190 has a planar striking portion 212 and two triangular shaped arms 214 which extend perpendicularly in the same direction from the striking portion 212. Holes are formed in each arm 214 of the lever plate 190 to receive a pin 216 for pivotally mounting the lever plate 190 to the frame 158 of the gel seeder. The arms 214 of the plate are linked to the pump nozzle 180 by a pin 218 which is received between the legs 219 of the U-shaped boss 188 formed on the pump nozzle and through holes formed near the ends of the arms 214 of the lever plate 190.

Wrapped around the pin 216 about which the lever plate pivots is a spring clip 220. One leg 222 of the spring clip 220 is received by a hole 224 formed in the frame 158 of the seeder while the other leg 226 of the spring clip is hooked about an edge 228 of one arm 214 of the lever plate. The spring clip 220 keeps the lever plate 190 biased outwardly from the frame 158 with its striking portion 212 in contact with the head 206 of the striker assembly 204 and biases the pump nozzle 180 in a downwardly extended position within the pump tube 178. The pivotal action of the rocker arm 194 as the cam follower 200 rides up on a cam surface 202 of the cam plate 148 compresses the spring clip 220 and causes the lever plate 190 to move in an arc about the pivot pin 216, as shown by arrow A in FIG. 6 of the drawings. This in turn causes the pump nozzle 180 to slide upwardly within the pump tube 178, as shown by arrow B in the same figure. The reciprocating motion of the pump nozzle 180 within the pump tube 178 dislodges metered amounts of gel suspension filling the pump tube and nozzle. The suspension is dispensed in clumps from the outlet opening 230 of the nozzle 180.

As with the other embodiment, the rocker arm assembly 192 and jack shaft 196 in this alternate embodiment can be positioned at various points on the jack shaft 196 so that the cam follower 200 registers with a selected set of cam surfaces 202. This changes the periodicity at which the gel carrier is dispensed in clumps. The clump pump can be deactivated by moving the cam follower 200 radially outwardly on the cam plate 148 so that it no longer is in register with any cam surfaces 202.

The frame of the gel seeder includes two tubes 232 mounted on its underbody. The tubes 232 receive shafts 234 which are connected to a coulter 236 and coverer 238. Set screws 240 threaded through openings in the tubes 232 hold the coulter 236 and coverer 238 in any selected position relative to the frame 158 and at any desired depth in the ground.

It is thus seen that the present invention provides an effective yet simple device to meter a desired quantity of seed carried in a gel carrier for dispersion during seeding in either a controlled continuous stream or in controlled spaced pulses. The plug mixes on the market today will not clog the gel seeder of the present invention, as they will do with many other seeding devices. The gel seeder can accept, for example, mixes of gel and finely ground eet or gel and fertilizer or other fluid suspensions and distribute these mixes either continuously or in small metered amounts. It is also evident that the invention disclosed herein may be utilized in other applications for the delivery of a fluid in either a continuous stream or pulsed batches.

What is claimed is:

1. A seeding device for delivery of seed carried in a fluid delivery substance comprising, a housing, storage means on said housing for retaining a supply of seed in said fluid delivery substance, metering means operatively connected to said storage means to transfer said seed in said fluid delivery substance to a delivery outlet, means to selectively vary said metering means to control the quantity of said seed in said fluid delivery substance dispensed from said delivery outlet, means to eject said fluid delivery substance in spaced pulsed batches, said means to eject said fluid delivery substance in spaced pulsed batches includes a flexible bulbous storage member in fluid communication with said delivery outlet and wherein said fluid delivery substance is retained within said bulbous storage member to be ejected at predetermined spaced intervals, and drive means associated with said housing to move said housing and said metering means along an area to be seeded, said drive means including a wheel support for rolling contact with the ground and means operatively interconnected said wheel support to said bulbous storage member to eject said fluid delivery substance at said predetermined spaced intervals, said means operatively interconnecting said wheel support to said bulbous storage member includes a cam means coupled to said wheel support for rotation therewith, a rocker arm pivotally secured to said housing, a cam follower carried by said rocker arm, means for selectively positioning said cam follower with respect to said cam means to enable contact at selectively variable intervals between said cam means and said cam follower upon rotation of said wheel support, the contact effecting an intermittent pivoting movement of said rocker arm from a first position to a second position, said rocker arm including means for contacting said bulbous storage member and being displaced from said bulbous storage member when said rocker arm is in said first position and pivotable to a second position in operative position to effect discharge of said fluid delivery substance from said bulbous storage member when said rocker arm is in said second position.

2. A seeding device as defined in claim 1 wherein said metering means comprises an auger feed device having an inlet end in operative communication with said storage end and a discharge end in operative communication with said delivery outlet.

3. A seeding device as defined in claim 2 including means operatively interconnecting said wheel support to said auger feed device to effect actuation of said auger feed, device when said wheel support is rotated.

4. A seeding device as defined in claim 3 wherein said auger feed device includes an auger and an auger housing surrounding said auger, said auger having a shaft including an extension thereof extending to the exterior of said auger housing and including coupling means thereon operatively coupling said auger to said wheel support whereby rotation of said wheel support effects rotation of said auger.

5. A seeding device as defined in claim 4 including drive plate means fixed to rotate with said wheel support and wherein said coupling means comprises a friction wheel member adapted to frictionally engage said drive plate wherein rotation of said drive plate responsive to rotation of said wheel support effects rotation of said friction wheel member to actuate said auger.

6. A seeding device as defined in claim 5 including means to vary the position of said friction wheel member along the radial extent of said drive plate means thereby to vary the rate of rotation of said auger to effect a variation in the flow rate of said fluid delivery substance.

7. A seeding device as defined in claim 1 wherein said cam means includes a plate member fixed to rotate with said wheel support having a plurality of circumferentially spaced inclined cam surfaces positioned to be in register with said cam follower wherein said cam follower in contact with said cam means moves from its said first position to its said second position as each of said plurality of inclined cam surfaces rotates into registry with said cam follower as said wheel support is rotated.

8. A seeding device as defined in claim 7 including a plurality of sets of said circumferentially spaced inclined cam surfaces at discrete spaced radial locations on said plate member said means for selectively positioning said cam follower with respect to said cam means serving to locate said cam follower to a selected radial set of inclined cam surfaces thereby to select a different discrete distance between the spaced pulsed batches of said fluid delivery substance ejected.

9. A seeding device as defined in claim 1 wherein the fluid delivery substance containing the seed is dispensed from the delivery outlet in a continuous flow.

* * * * *